United States Patent [19]
Stateczny et al.

[11] Patent Number: 6,081,644
[45] Date of Patent: Jun. 27, 2000

[54] CABLE SLEEVE WITH A HOLDING APPARATUS FOR CARTRIDGES OR CASSETTES FOR STORING AND SPLICING LIGHT WAVEGUIDES

[75] Inventors: Michael Stateczny, Luedenscheid; Franz Froehlich, Hagen, both of Germany

[73] Assignee: RXS Kabelgarnituren GmbH, Hagen, Germany

[21] Appl. No.: 09/044,250

[22] Filed: Mar. 19, 1998

[30] Foreign Application Priority Data

Apr. 15, 1997 [DE] Germany .......................... 197 15 711
Dec. 1, 1997 [DE] Germany .......................... 197 53 283

[51] Int. Cl.[7] ................................................ G02B 6/36
[52] U.S. Cl. ................................... 385/135; 385/134
[58] Field of Search .................................. 385/134–137

[56] References Cited

U.S. PATENT DOCUMENTS

| 4,832,436 | 5/1989 | Goto et al. ........................ 385/135 |
| 5,247,603 | 9/1993 | Vidacovich et al. ............... 385/135 |
| 5,323,478 | 6/1994 | Milanowski et al. .............. 385/135 |
| 5,323,480 | 6/1994 | Mullaney et al. ................. 385/135 |
| 5,515,472 | 5/1996 | Mullaney et al. ................. 385/135 |

FOREIGN PATENT DOCUMENTS

| 0 717 862 | 6/1996 | European Pat. Off. . |
| WO 96/32660 | 10/1996 | WIPO . |

*Primary Examiner*—Hemang Sanghavi
*Attorney, Agent, or Firm*—Hill & Simpson

[57] ABSTRACT

In a cable sleeve with a holding apparatus for cassettes for storing and splicing light waveguides, the cassettes are arranged in a hinged fashion along an axis of rotation along one edge of the cassette so that the cassettes can be arranged one over the other and be folded up into an operating position or released into a storage position.

19 Claims, 12 Drawing Sheets

CABLE SLEEVE WITH A HOLDING APPARATUS FOR CARTRIDGES OR CASSETTES FOR STORING AND SPLICING LIGHT WAVEGUIDES

BACKGROUND OF THE INVENTION

The present invention is directed to a cable sleeve with a holding apparatus for cartridges or cassettes for storing and splicing light waveguides, wherein the cassettes are individually accessible.

Published International Patent Application WO 96/32660 discloses a cable or jacket sleeve made of a jacket element and a sealing element with cable inlets and an annular sealing apparatus between the sleeve element and the sealing element. The cable sleeve comprises a holding apparatus for mechanically connecting the sleeve element to the sealing element. In addition, a cartridge holder or cassette holder for light waveguide cassettes is provided and is fastened to the sealing body in the interior of the cable sleeve. The individual cassettes are arranged in parallel alongside one another in a block formation and can be made accessible either by displacement or by means of pivoting about a point of rotation.

In previously-used splicing systems, there is often a lack of packing density that, is required when up to 200 or more fibers have to be spliced per connection point or branch point, or a selection of the fiber division has to be made from the beginning, which can be altered only with great difficulty, if at all, during later changes. However, in the case of different cabling designs, different cassettes are also necessary, which then can no longer be exchanged with one another. The cabling in the sleeve has previously been cable-oriented, and can lead to unintended disturbances of transmissions in the fibers during switching and maintenance work.

SUMMARY OF THE INVENTION

The object of the present invention is to carry out a wide variety of splice systems of glass fiber connections on the path with only one cartridge or cassette construction and to enable unproblematical execution of later modifications. Moreover, a customer-oriented fiber management is to be created that enables an optimum between the splicing expense and the transmission security. The object posed is now solved according to the invention in that each cassette comprises, along a longitudinal edge, a pivot axis composed of at least two laterally-extending axle pegs or pins, with each pin having a catch projection, and in that each cassette is arranged in a hinged fashion with the axle pegs on a cassette holder, and in that each cassette can be held in at least one position with the catch projections in a catch mechanism on the cassette holder, and in that the light waveguides are guided to the individual cassettes in an open space of the cassette holder, and in that the light waveguide cable inlets on each of the cassettes is respectively arranged on the longitudinal edge extending along the pivot axis.

Advantages of the inventive cable sleeve with a holding apparatus for cassettes results, first of all, due to the fact that the number of cassettes, as well as the assembly time for the laying and introduction of the light waveguides, can be reduced considerably. Moreover, in the guiding of the light waveguides, no adverse effect is to be expected on the transmission of the light waveguides, among other things, also with respect to the mutual influence. The arrangements according to the invention can be used in a coupler, in a main distributor or also in various distributor boxes with the same advantage.

A main part of this cassette system according to the invention is formed by a cassette suited specifically for receiving, storing and splicing the light waveguides. In a cassette or cartridge, up to 12 fibers can be spliced, for which purpose a corresponding bundle of fibers, which are more than one buffered fiber having an excess length, is introduced into the cassette. The fibers are thereby held in the cassette by means of corresponding hold-down clamps so that the unintended springing out of the fibers is prevented. In addition, two circularly rounded guides are provided that ensure that the minimum bending radius of the light waveguides is not exceeded. Moreover, it is thereby possible for the light waveguides to be able to cross in a figure 8 pattern, whereby the direction of winding and, thus, also the exit direction of each of the light waveguides can be altered or changed. This serves, for example, for the combination of the fibers in the bundle of fibers from and to the customer, as described in the following description.

In addition, in the inventive cassette, it is possible to introduce a maximum of 2×6 fiber bundles with a diameter of 2 mm to 2.4 mm and a typical number of 2 or 4 fibers per bundle. This has the advantage that a partitioning of many fibered bundles of fibers, such as, for example, from an incoming cable into fiber bundles with fewer fibers, such as, for example, an outgoing cable, can be carried out. The fiber bundles are thereby guided into corresponding cassettes directly from the cable, whereby a more compact splicing and, therefore, a reduction in assembly time can be achieved. The cassette according to the present invention comprises at least two axle pegs along the longitudinal edge that lies on the axis of rotation, with which pegs the cassette can be set pivotably into the cassette holder. In addition, the clamping point for reserve leads is provided on each cassette, which serves for the fixing of the fiber ends in the cassette and for easier location.

The cassette holder provided for holding the cassettes can preferably house 39 of these cassettes and can be shortened or lengthened according to need and to the space requirements of the surrounding housing. The cassette holder is connected directly with the sealing element of the respective sleeve and can be pivoted away from the sealing element as needed in order to ensure freedom of assembly for later equipping with cables. In addition, the cassette holder has a catch mechanism into which the axles or pegs of the cassettes can be snapped. Since the axles or axle pegs comprise catch projections that engage in corresponding latches on the catch mechanism, it is possible to position the cassettes in at least one position in such a way that a good accessibility is respectively provided for a cassette. The catch mechanism preferably consists of a resilient catch rail that releases the latches when lateral pressure is applied, so that the initial position or, respectively, storage position of each cassette can be restored. The release of the latches usefully occurs for all of the cassettes, so that, upon release, all cassettes fall back into their storage position.

In a back part of the cassette block, there is a reserve space in the region of the cassette holder in which reserve leads or uncut fiber bundles can be stored. The supplying of fiber bundles to the individual cassettes also occurs through this reserve space to the back side of the cassette block, by which means excellent visibility can be achieved. For the protection of the light waveguides in each of the fiber bundles, after the introduction of the light waveguide cables, these fibers are guided into the cable sleeve in a flexible protective tube, so that the risk of damage can be kept as low as possible. The reserve space, with a depth of about 30 mm, is formed by a pivoting frame fastened to the cassette holder, so that the frame can be pivoted toward the rear. By this means, the accessibility to the lead introduction region for the cassette is improved. The spacing of 30 mm to 40 mm is necessary to enable the introduction of the fiber bundles to the cassettes with the necessary bending radius.

The subject matter of the invention also includes a fiber management based on various cabling designs between the individual cassettes. By means of this fiber management, it is possible to provide a variable and customer-oriented cabling design. Thus, a fiber bundle coming in from the main or ring cable is, for example, guided directly up to a distributor cassette. From here, the fibers assigned to the subscriber are partitioned to individual splicing cassettes in a protective sheath. According to the number of fibers, the lead to the subscriber can then be led out from the splicing cassette directly to the subscriber or can be led back into the distributor cassette in individual fibers via protective sheaths. At the distributor cassette, the fibers are then combined and guided to the subscriber. Given guiding of four or more fibers to several subscribers, better visibility is achieved if a specific cassette is used as a subscriber cassette. This fiber management system is specified in more detail hereinafter on the basis of the various Figures. In addition, it is advantageous that a single type of cassette can be used as an input/output cassette, as a connection cassette or as a subscriber splicing cassette. In the case of a pure connection of two fiber bundles with a maximum of 12 fibers, a cassette of this type can also be used as a normal splicing cartridge or cassette.

Another or additional object of the present invention is to enable execution of a wide variety of splicing systems of the glass fiber connections on the path with only one cassette construction, and to enable unproblematic execution of later modifications, whereby this embodiment of the cable sleeve according to the previous embodiments is to be further improved as a modified cable sleeve. This object is solved according to the invention with a cable sleeve of the type mentioned above, in that each cassette can be removed from the cassette holder individually or in a combined block of cassettes.

Advantages of the inventive modified cable sleeve with a holding apparatus for cassettes also occurs, first of all, in that the number of cassettes, as well as the assembly time for the laying and introduction of the light waveguides, can be reduced considerably. In addition, in the guiding of the light waveguides, no adverse effect on transmission of the light waveguides is to be expected, among other things also with regard to the mutual influence. The arrangements according to the invention can be used in a coupler, in a main distributor or also in various distribution boxes with the same advantages.

A main part of the cassette system according to the present invention, in turn, forms a cassette for accepting, storing and splicing of the light waveguides, which cassette is specifically suited for this purpose, but modified. In a cassette of this sort, up to 12 fibers can be spliced, for which purpose the corresponding bundle of fibers is introduced into the cassette. The fibers are thereby held in the cassette by means of corresponding hold-down clamps in order to prevent the accidental springing-out of the fibers. According to the present invention, these hold-down clamps are bent downward at their ends. Moreover, two bent or curved guides are provided here to ensure that the bending radius of the light waveguides does not fall below the minimum. In addition, there is a possibility that the light waveguides can cross in a pattern of a figure 8, whereby the winding direction and thereby also the exit direction of the light waveguides can be modified. This serves, for example, for the combination of the fibers in a fiber bundle to extend to and from the customer.

In addition, each cassette has a clamping point which is provided for reserve fibers and which serves for the fixing of non-used fiber ends in the cassette and for easy location. The modified cassette also has two plugging locations for a protective sheath interconnection, by means of which the individual fibers in another cassette can be partitioned or separated.

The cassette holder provided for the holding of the cassette can also preferably house 39 of the described cassettes and can be shorted or lengthened as needed and according to the space relation of the surrounding housing. The cassette holder is connected directly to a sealing element of the respective cable sleeve and can be pivoted away from the sealing element as needed, in order to ensure freedom of assembly for later subsequent equipping of cables. In turn, the cassette holder has a catch mechanism into which the axle or axle pegs of each of the cassettes can be set and can be anchored with stop pins. Because the axles or axle pegs comprise catch projections that engage in corresponding latches of the catch mechanism, it is possible to position the cassette in at least one position in such a way that good accessibility is provided to each cassette. Preferably, the catch mechanism consists of a resilient catch rail that releases the latches when pressure is exerted on the cassette in a perpendicular direction, so that the initial position or, respectively, storage position of the cassette can be reproduced. Advantageously, the detachment of the latches occurs for all of the cassettes, so that, during detachment, all of the cassettes can be pushed back into the storage position. The catch mechanism can be combined to form a unit in conjunction with the cassette, especially seven or eight pieces. This possibility is important for particular assembly technologies in order to store the cassettes on the splicing apparatus for the splicing of fibers. On the back side of the cassette block, in the modified embodiment, as in the original form, a reserve space is located in the region of the cassette holder in which reserve leads or uncut fiber bundles can be stored. The supplying of the fiber bundles to the individual cassettes also occurs across this reserve space to the back side of the cassette block, whereby excellent visibility can be achieved. For the protection of the light waveguides of each of the fiber bundles after the introduction of the light waveguide cables into the cable sleeves, these leads are guided in flexible protective tubes, so that the risk of damage can be kept as low as possible. The reserve space, with a depth of about 30 mm, is formed by a pivoting frame fastened to the cassette holder and is fastened movably to the cassette holder, so that it can be pivoted to a rear position. By this means, the accessibility to the lead introduction region in the cassette is improved. The spacing of 30 mm to 40 mm is necessary in order to enable the fiber bundles to be brought to each of the cassettes with the required bending radius.

A fiber management system is also part of this invention, based on different cabling designs between the individual cassettes. By means of this fiber management system, it is possible to provide a variable and customer-oriented cabling design. Thus, for example, a fiber bundle coming from a main or ring cable is guided directly up to a distribution cassette. From here, the fibers assigned to a subscriber are separated in protective sheaths to the individual splicing cassettes. According to a number of fibers, the lead for the subscriber can then be led out from the splicing cassette directly to the subscriber, or can be led back into the distribution cassette in individual fibers via protective sleeves. There, the fibers can then be combined and guided to the subscriber. Given guiding of four or more fibers to several subscribers, better visibility is achieved if a specific cassette is used as a subscriber cassette.

In addition, it is advantageous that a single type of cassette can be used as an input/output cassette, as a connection cassette or as a subscriber splicing cassette. In the case of the pure connection of two fiber bundles with a maximum of 12 fibers, a cassette of this type can also be used as a normal splicing cassette.

Other advantages and features of the invention will be readily apparent from the following description of the preferred embodiments, the drawings and claims.

DESCRIPTION OF THE PREFERRED EMBODIMENTS

Figure 1:
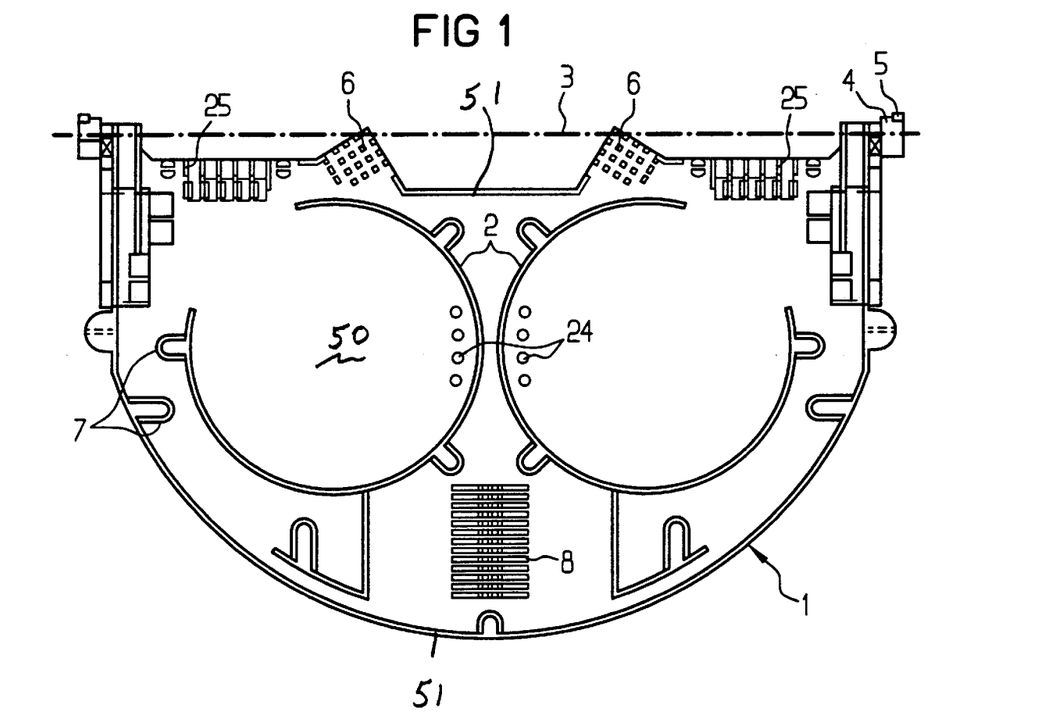
FIG. 1 is a plan view of a cassette for light waveguides, such as optical fibers, in accordance with the present invention, which cassette is configured for use in a cable sleeve.

The principles of the present invention are particularly useful when incorporated in a semicircular cassette for light waveguides, which is generally indicated at 1 in FIG. 1. The cassette 1 has a planar base 50 with side walls 51 and several guide rails 2 extending perpendicular from the base 50 to form a space for receiving optical waveguides or fibers. The side walls 51 and rails 2 have a plurality of hold-down clamps 7, which will hold introduced light waveguide fibers between the clamps 7 and base 50 and will keep the waveguides from springing out of the cassette 1. Two of the circular guide profiles or rails 2 can be seen, from which light waveguides can be laid. By means of this guiding, it is possible to cross the light waveguide fibers between the two circular guide rails so that the fibers running in opposite directions can be obtained. The cassette 1 has inlets 6 and 25, which are arranged along one side wall 51 in such a way that they run tangentially to the circular guide rails 2 so that the additional guiding can occur without endangering the light waveguide fibers. In addition, a splice holder 8 is provided on the base 50 so that the light waveguide splices can be fixed. The pivoting axle 3 runs along a longitudinal edge of the cassette or cartridge 1 and the axle consists of at least two laterally-projecting axle pegs or pins 4, with which the cassette can be set into the mounts of the cassette holder. The axle pegs 4 have catch projections 5 that enable snapping of the cartridge or cassette into a holder. In addition, pins 24, which extend from the plane of the base 50, are provided and reserve fibers can be fastened. The protective sheaths or tubes, in which the light waveguide fibers are guided from the partitioning cassette into the customer or subscriber cassettes, are fastened onto the inlets 6 and 25.

Figure 2:
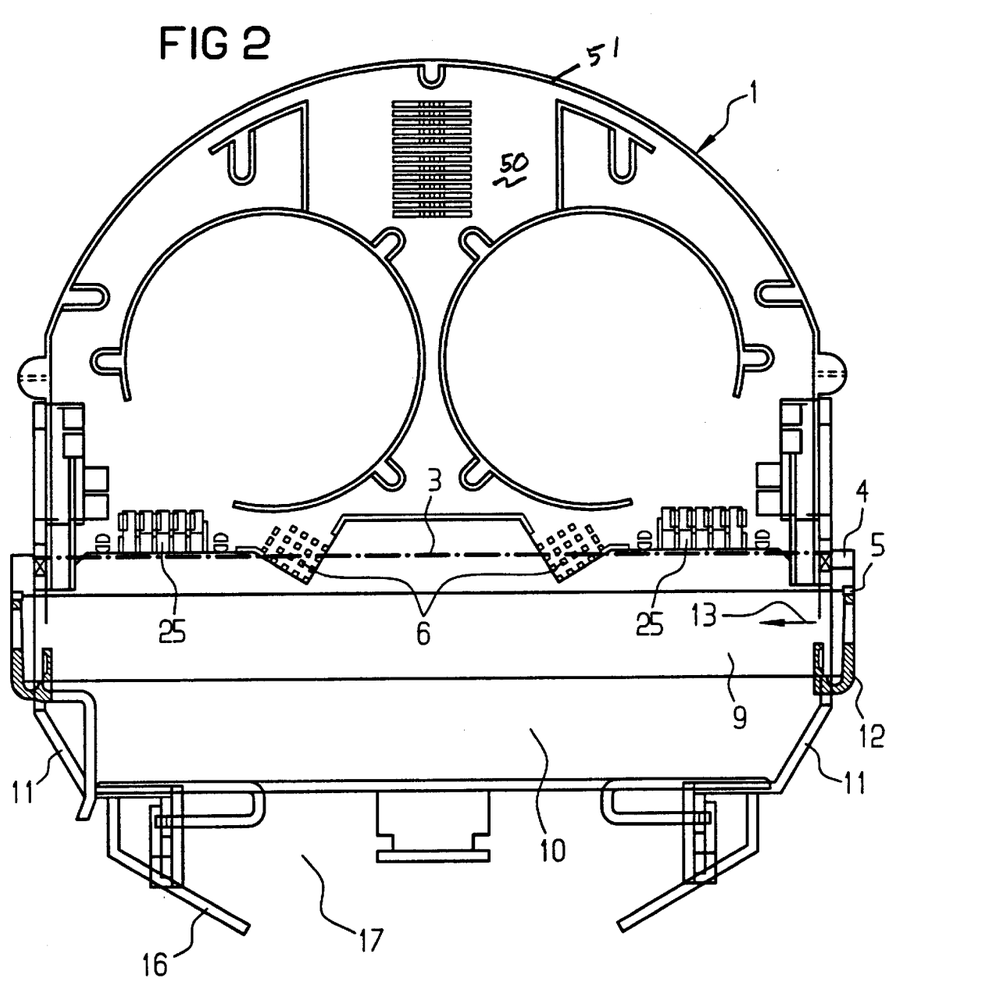
FIG. 2 is a cross-sectional view with portions in elevation showing an arrangement of the cassette of the present invention in a cassette holder.
Figure 3:
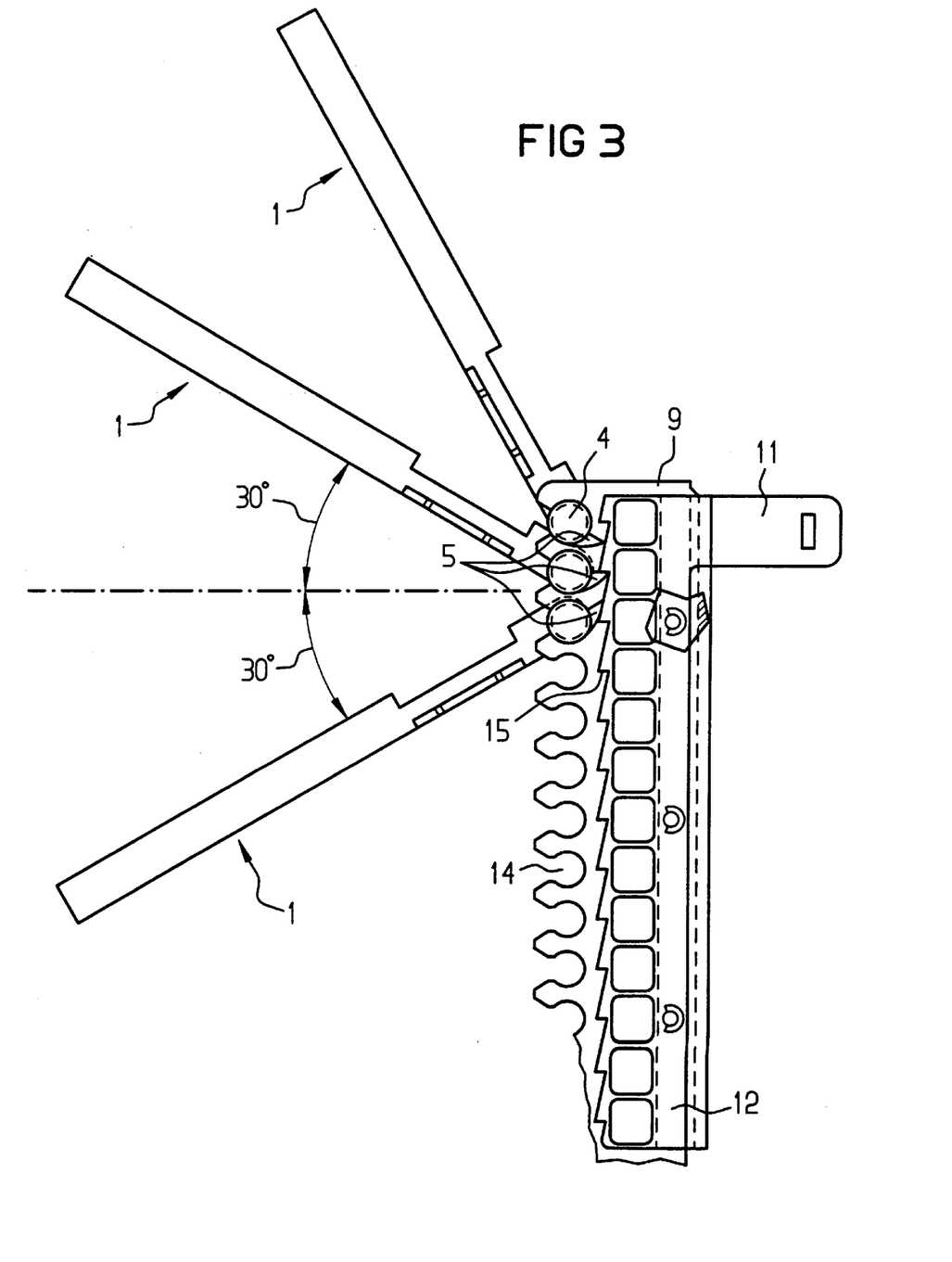
FIG. 3 is a side view of the cassette holder of FIG. 2 showing the pivotable arrangement and positions for cassettes in the cassette holder.

As shown in FIGS. 2 and 3, the cassette 1 is pivotably arranged in a cassette holder 9 with the axle pegs 4 in a catch mechanism of the cassette holder 9. The cassette holder 9 comprises, on both sides, two spring-mounted catch rails 12 as a catch mechanism, in whose latches the catch projections 5 engage in a stopping fashion, as shown in FIG. 3. Given lateral pressure on the catch rails 12 in the direction of arrow 13, the latches are detached and the cassette can fold back into the corresponding rest position. In addition, the cassette holder has brackets 11 which are set on the cassette holder 9, by means of which an open space 10 for the fiber guiding between the individual cassettes is obtained. Finally, a pivoting frame 16 is held in this open space by the bracket 11 so as to be connected to the holder and the frame 16 forms a reserve space 17 for the storing or, respectively, guiding of reserve leads or uncut light waveguide leads.

As best illustrated in FIG. 3, the cassette holder 9 has catch receptacles 14 for receiving the axle pegs 4 of the cassettes 1, so that the cassettes can be arranged one over the other in the holder. To insert the cassette 1, it is introduced into one of the catch receptacles 14 in the position indicated by the uppermost of the three cassettes of FIG. 3. It is then folded downward, and in this folding process, the catch projection 5 will snap into a sawtooth-like latch 15 of the catch rail 12 and thereby be held in a position of the second cassette at an angle of 30° above a horizontal line. If the catch rail 12 is pressed inward toward the cassette holder 9, the catch projection 5 of the axle peg 4 is released and the cassette will fall downward into a rest position shown by the lowermost of the three cassettes in FIG. 3, which position is 30° below the horizontal. If access to a particular cassette 1 is now desired, the cassette or cassettes above the selected cassette are folded up and remain in the upper catch position. By means of this, there results a doubled opening angle of preferably 60°, so that this cassette is accessible for assembly or service purposes. At the upper end of the cassette holder 9, the bracket 11 can be seen that holds the pivoting frame 16 at a particular spacing from the cassette block. The corresponding open space is used to house the protective sheaths of the individual fibers.

Figure 4:
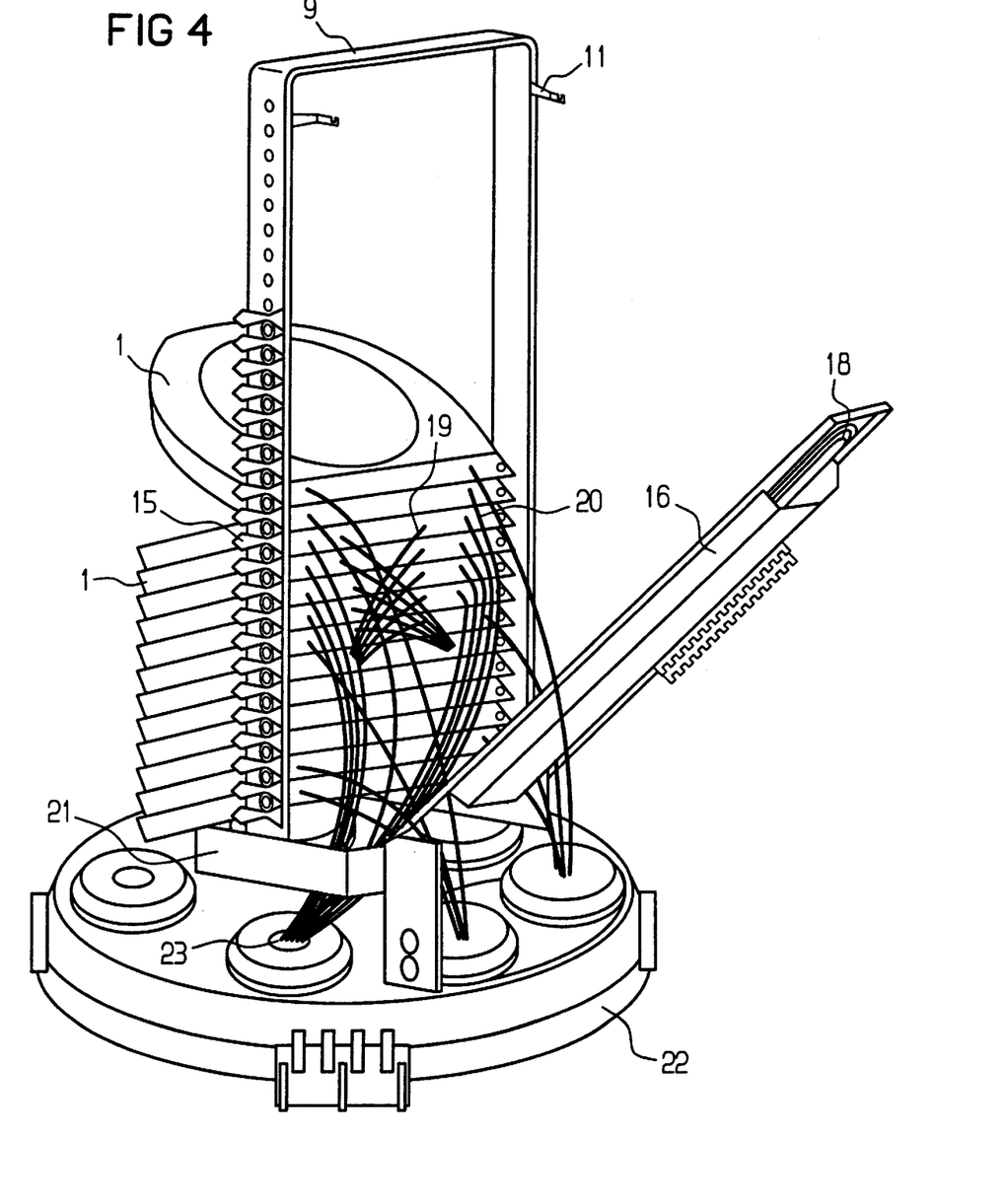
FIG. 4 is a perspective view of the cassette holder of the present invention mounted on a sealing element of a cable sleeve.

As best illustrated in FIG. 4, the cassette holder 9 with the brackets 11, which at the same time forms a locking apparatus for the pivoting frame 16, is arranged, preferably pivotably, on a sealing element 22 of a cable sleeve with a base angle 21. The representation has been selected so that the cassettes 1 for the light waveguides are directed to the rear, whereby the uppermost cassette is folded up so that the one underlying it is freely accessible. At the side, the latches 15 of the catch mechanism are indicated. The cable inlets 23 in the sealing element 22 of the cable sheaths are likewise indicated. The fiber bundles 20 are guided from the inlet 23 to each of the cassettes 1, where they are correspondingly stored, distributed, spliced and guided back. The guiding of the light waveguides of the fiber bundles or, respectively, protective sheaths for the fibers 19 or 20 for transfer or, respectively, distribution from one cassette to another are also outlined. This outlining indicates that the distribution can be produced in a highly visible form in the open space of the cassette holder 9. Since the pivoting frame 16 that is provided for the reception of reserve leads or uncut leads can be folded to the rear, good access is provided to the open space for the lead guiding between the cassette holder 9 and the various cassettes.

In summing up what is shown in FIGS. 3 and 4, the functional sequence can be described as follows:

On a cassette holder 9, the already-described catch rails 12 of the catch mechanism, which preferably consists of an injection-molded part made of plastic, are respectively located on both sides opposite one another. The catch mechanism thereby consists of a part that is fixedly attached to the cassette holder 9 and that has a spring element (not shown) and latches 15. With these catch rails 12, the holding or, respectively, fixing of the cassettes in the folded-up position takes place, preferably at a 30° position above the horizontal. By this means, assembly work on the fibers in the cassette located thereunder is enabled, as already described. If the work process is terminated, the catch rails 12 are actuated to simultaneously unsnap all of the cassettes so that they will fall into their end position or, respectively, rest position. The cassettes then lie one over the other at an angle of approximately 30° below the horizontal. In this state, the sleeve is sealed. If needed, the individual cassettes can again be folded upward by 60° from the rest position after the opening of the cable sleeve for service work, whereby the already-described snapping of the catch projections 5 in the latches 15 will occur. In the construction of the catch projections, it is useful to provide these with a slant, so that the latches 15 of the catch rails 12 first glide along this slant until the catch projections leave the slant. The catch rail subsequently springs back, overlapping the catch projections, and finally again holds the cassette in the 30° upward position. This arresting mechanism is preferably attached to the cassette holder 9 on both sides and the process can be repeated any number of times.

Figure 5:
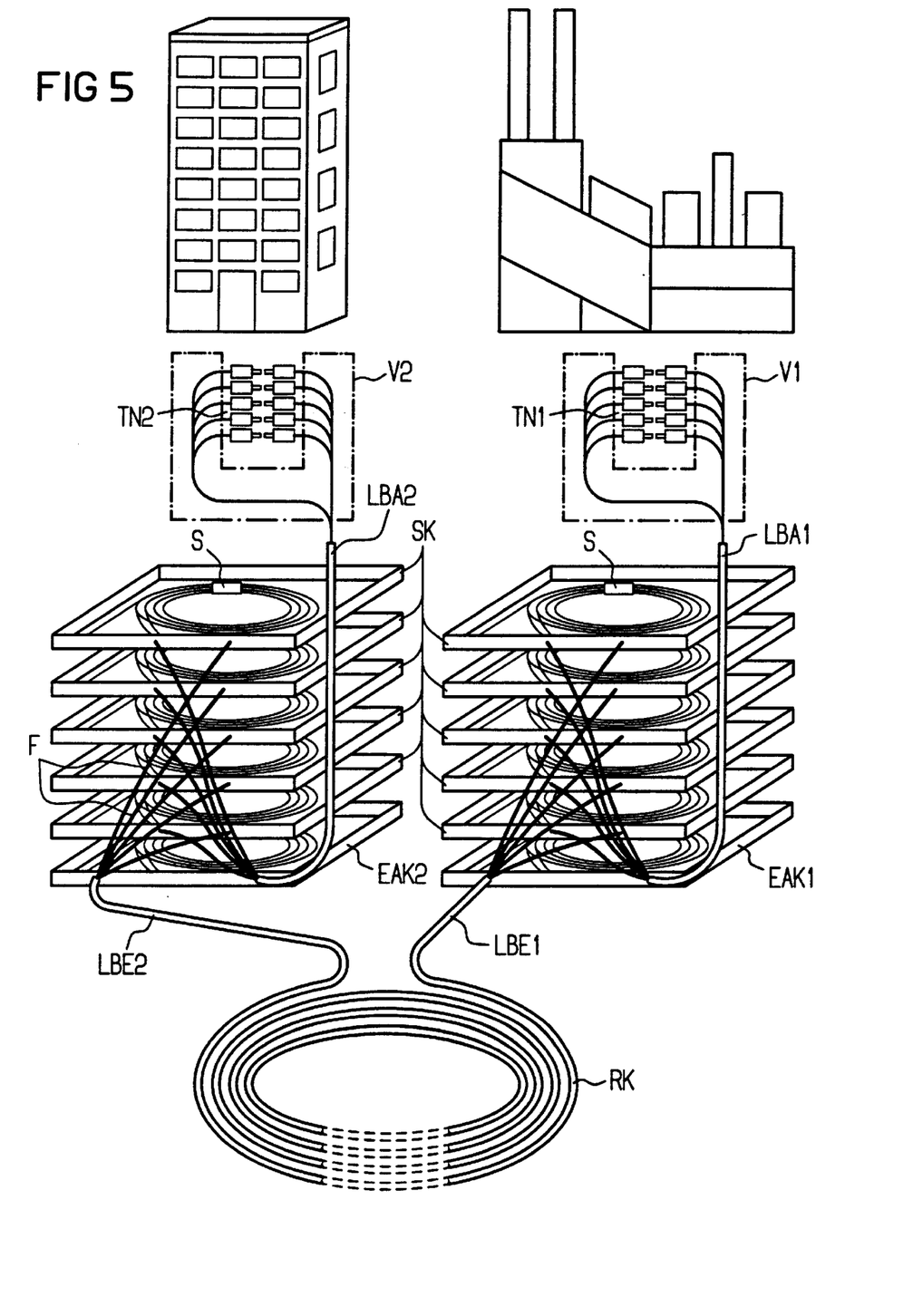
FIG. 5 shows a wiring diagram for two-fiber guiding to the subscriber.

A wiring diagram for a two-fiber guiding to the customer is shown in FIG. 5 From here, with two fibers respectively on an input/output cassette, which are splicing cassettes SK, an incoming light waveguide or fiber bundle LBE1 or, respectively, LBE2 from a main or ring cable RK is partitioned, spliced and then combined again to form a lead LBA2 via an additional partitioning V2, for example a sleeve, an end brancher, a housing terminal box for several apartments or subscribers. From the additional partitioning V2, the lead is guided to a subscriber TN2. Such a wiring diagram can also occur for the splicing of ring cable leads to ring, cable leads, if the subscribers are later still to be connected at this point. As shown, there are, for example, 5×2 fibers to a customer, whereby a lead contains 10 fibers. It follows from this that from one input/output cassette EAK1 or EAK2, a distribution to respectively five splicing cassettes SK will occur. The housing symbol at the top indicates which type of subscriber, which is a multi-unit building, is advantageously selected to use this type of partitioning.

Figure 6:
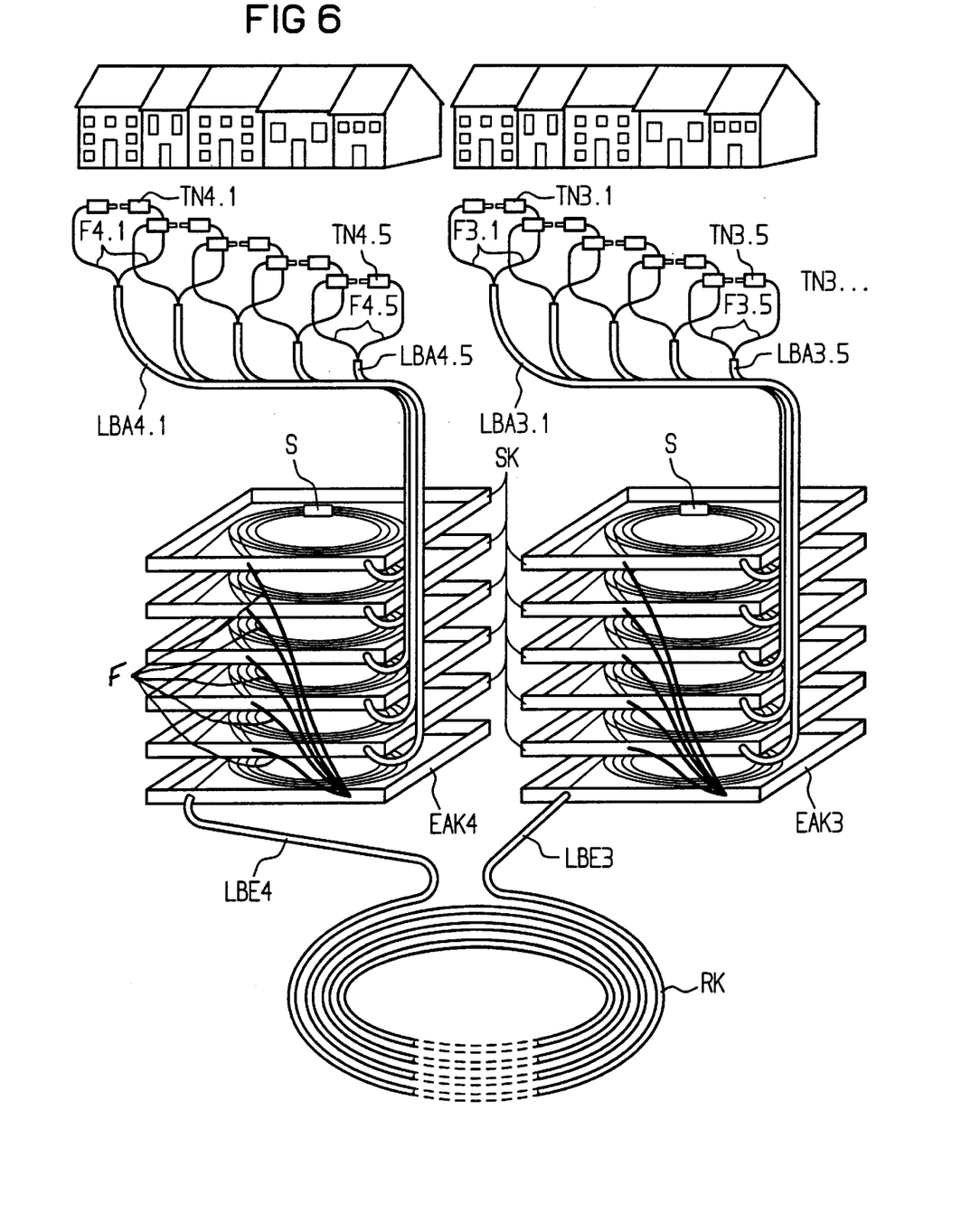
FIG. 6 shows and additional wiring diagram for two-fiber guiding to the subscriber.

An additional wiring diagram for two-fiber guiding to subscribers is shown in FIG. 6. Here, for example, two fibers each in five leads are guided to five subscribers TN3.1 to TN3.5 or TN4.1 to TN4.5. For each subscriber, two fibers F3.1 to F3.5 or, respectively, F4.1 to F4.5 are respectively guided. These two fibers per subscriber are led away from the individual splicing cassettes SK in individual light waveguide bundles LBA3.1 to LBA3.5 or, respectively, LBA4.1 to LBA4.5. An incoming light waveguide bundle of fibers LB3 or LB4, with ten fibers respectively from the ring cable or main cable RK, is thereby next inserted into a respective input/output cassette EAK3 or EAK4. The distribution occurs via fiber bundles F, which are surrounded by a protective sheath, from the input/output cassette EAK3 or EAK4 to, respectively, five splicing cassettes SK, each with two fibers. The housing symbols drawn indicates that a partitioning of this sort is suited for subscribers in individual houses.

Figure 7:
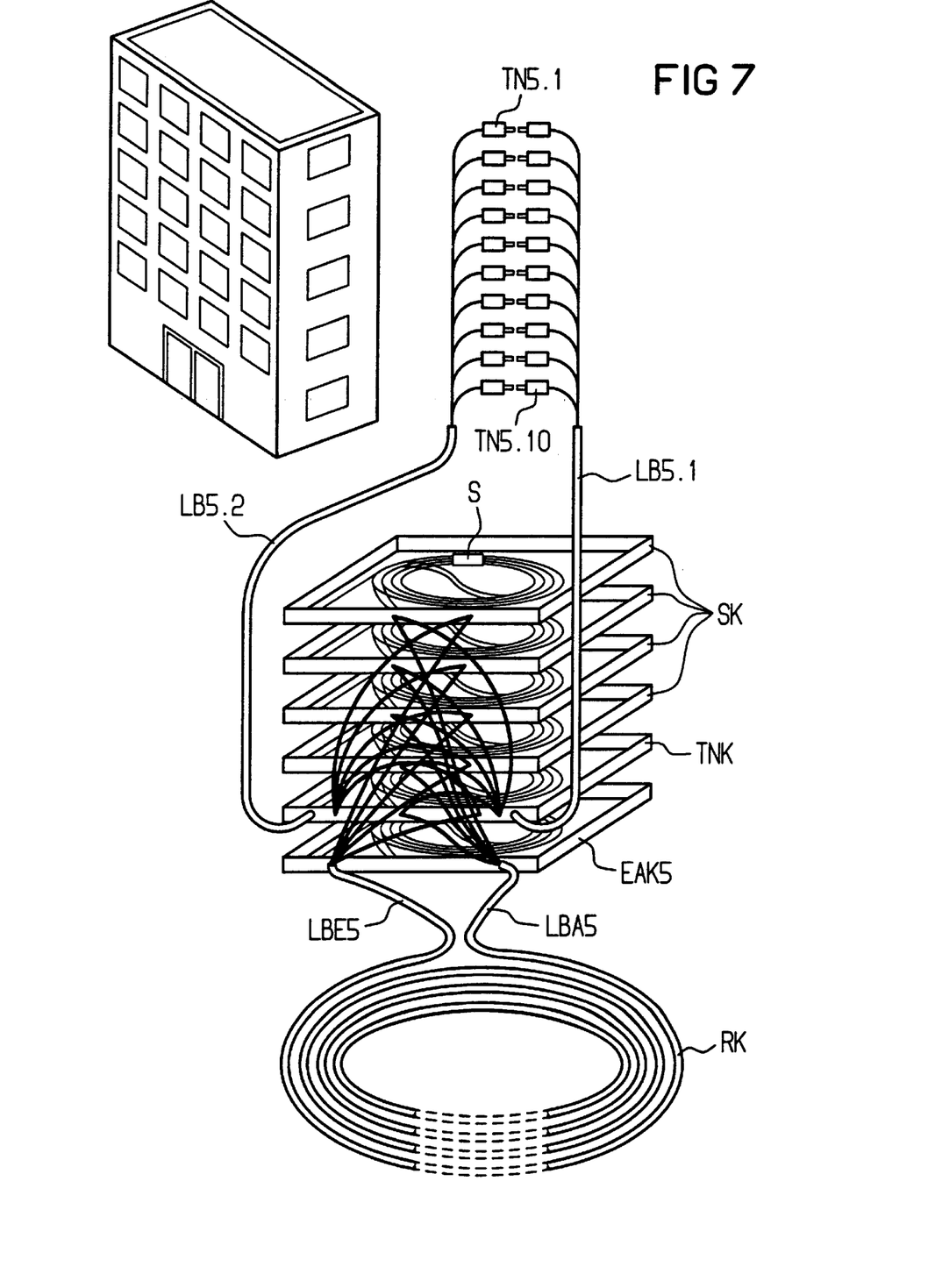
FIG. 7 shows a wiring diagram for a four-fiber guiding to a subscriber.

A wiring diagram for a four-fiber guiding to subscribers is shown in FIG. 7. Respectively, after introduction into an input/output cassette EAK5, one incoming light waveguide bundle of fibers LBE5 or, respectively, LBA5 from both sides of the ring cable or main cable RK is partitioned or separated and spliced, respectively, with two fibers on splicing cassettes SK, and these splicing cassettes have the two fibers subsequently combined at a subscriber cassette TNK. By this means, visibility is maintained, since, from here, the individual fibers are guided in two light waveguide bundles LB5.1 and LB5.2 to the subscribers TN5.1 to TN5.10. Here, 5×4 fibers are guided to a subscriber, whereby ten fibers are contained in each of the two leads. This diagram can also be used as in the arrangement according to FIG. 5 for the splicing of ring leads to the subscriber or from ring lead to ring lead. The housing symbol indicates that the wiring diagram is particularly suitable for connection to subscribers living in a multi-unit building.

Figure 8:
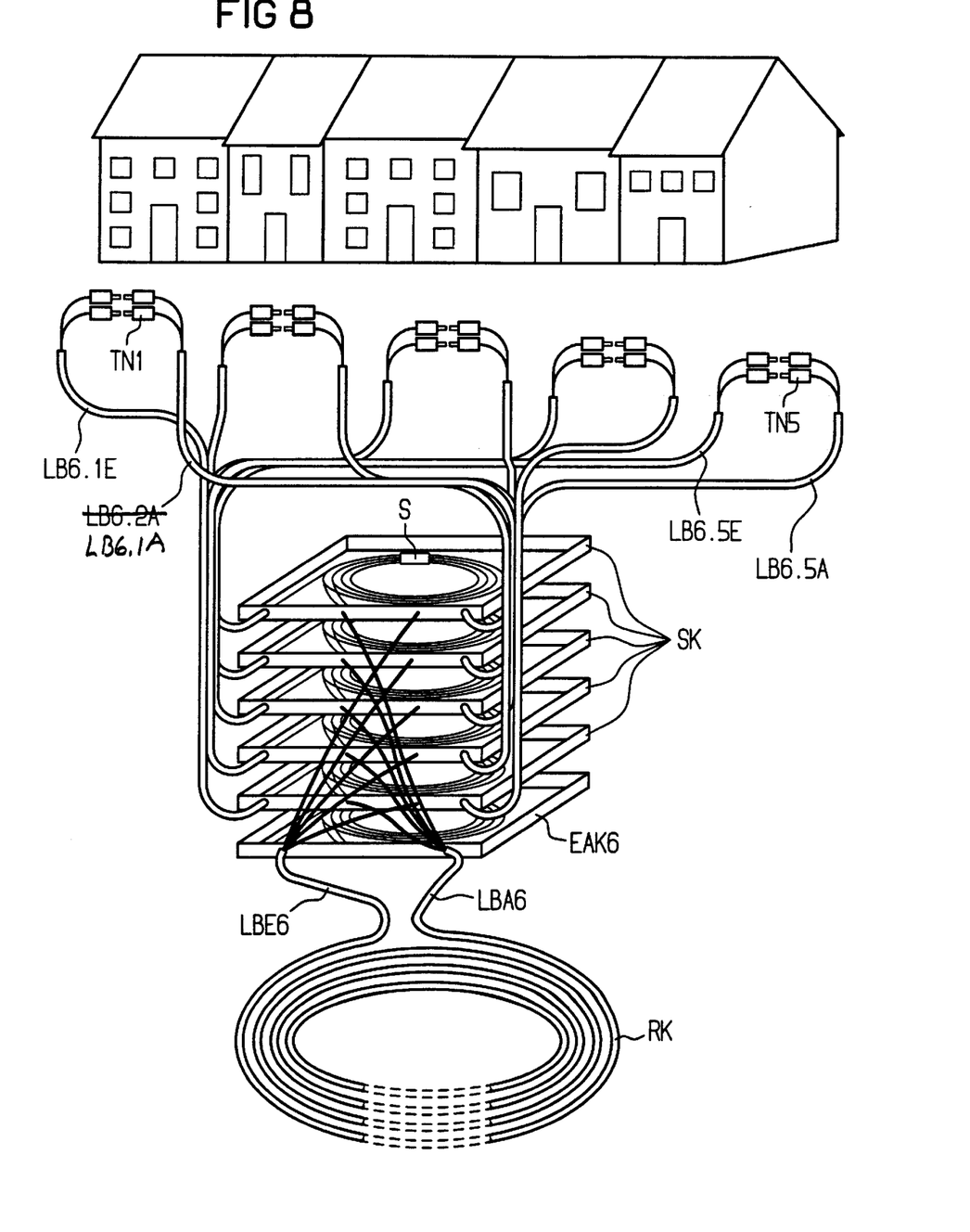
FIG. 8 shows an additional wiring diagram for a four-fiber guiding to a subscriber.

Another wiring diagram for a four-fiber guiding to subscribers is shown in FIG. 8. In the diagram, one incoming light waveguide fiber bundle LBE6 or LBA6 from both sides of a ring cable or main cable RK are separated and spliced, respectively, with two fibers on splicing cassettes SK, and are subsequently guided from each splicing cassette SK, respectively, with two light waveguide fiber bundles LB6.1E and LB6.2A to two bundles LB6.5E and LB6.5A to the subscribers TN1 to TN5. It is possible, respectively, to guide two fibers each to five subscribers, respectively, in 2×5 leads, each with two fibers. As indicated, this is desirable for use with a single-unit housing.

Figure 9:
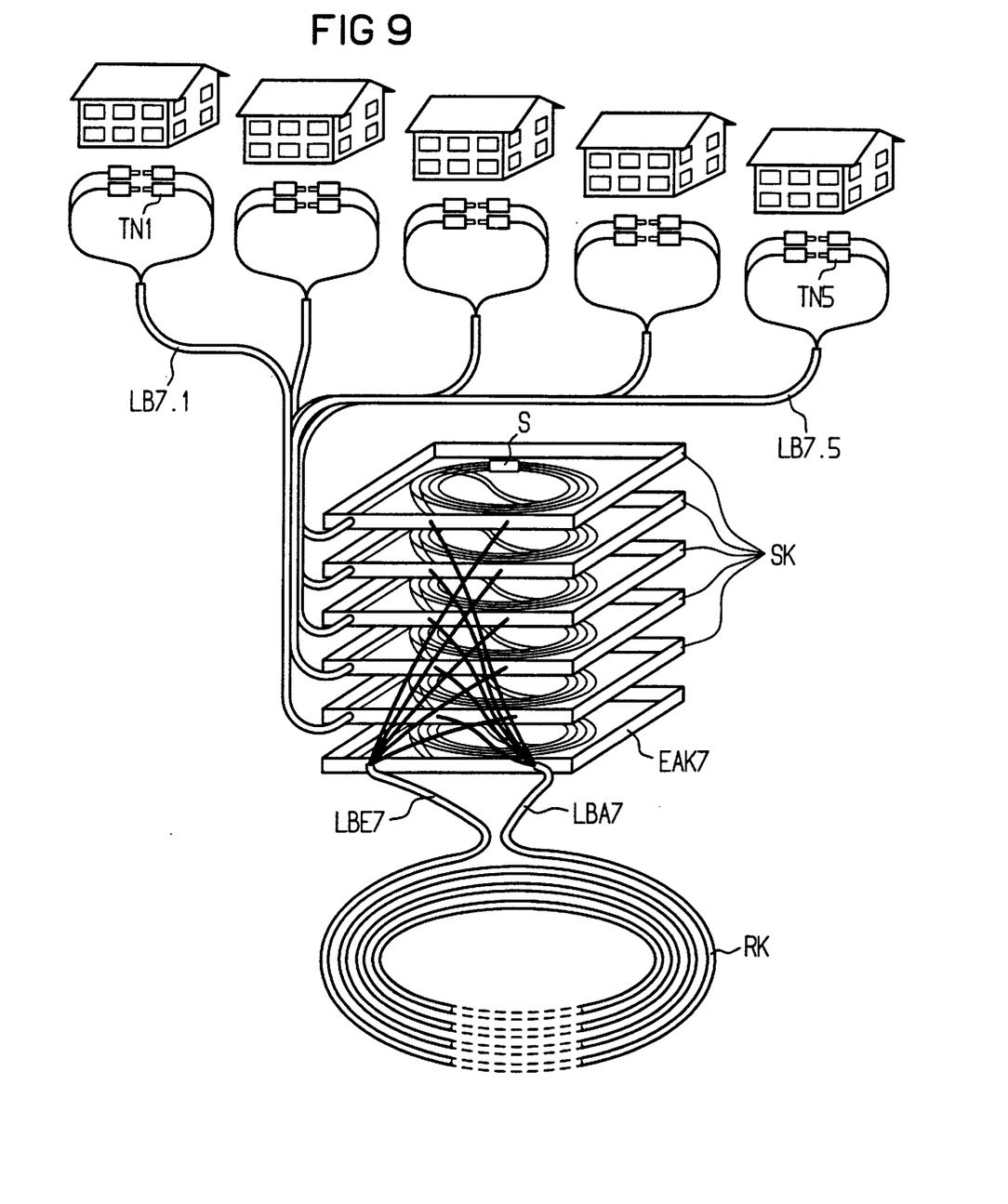
FIG. 9 shows a wiring diagram for a multi-fiber guiding to subscribers.

A wiring diagram for a multi-fiber guiding to subscribers is illustrated in FIG. 9. After introduction to an input/output cassette EAK7, two fibers each from the incoming light waveguide fiber bundles LBE7 and LBA7 of the ring cable RK are separated or partitioned to splicing cassettes SK and are spliced and then forwarded in leads LB7.1 to LB7.5 to the subscribers TN1 to TN5. Additional reserve fibers are stored in these cassettes.

It can be seen from the wiring diagrams for fiber guidings to customers, as shown in FIGS. 5–9, that an arrangement of splicing cassettes according to the invention permits a multiplicity of distribution possibilities, without principle requiring type changes. This results in easily surveyed partitioning at the optimum packing density. Furthermore, this results in a great savings in assembly work, since both the cassettes and the distribution of the light waveguide fibers at the back side of the cassette arrangement are easy to handle.

Figure 10:
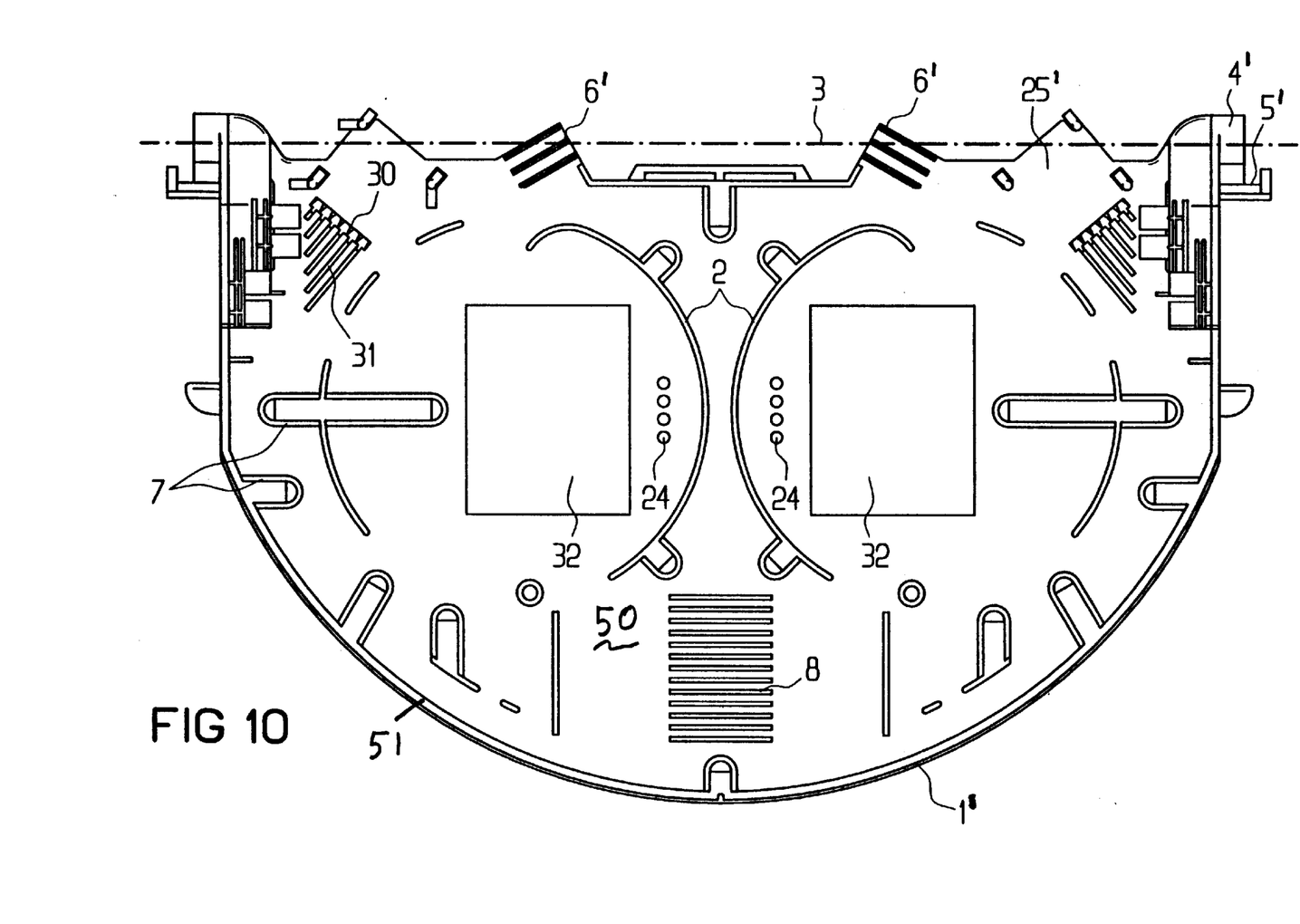
FIG. 10 is a plan view of a modification of the cassette for receiving optical fibers of the present invention, which cassette is used in a cable sleeve.

An embodiment of a semicircular cassette or cartridge 1' is shown in FIG. 10 and is modified to the original embodiment of the cassette 1. Again, several guide rails 2 are arranged to extend from a base 50 and have hold-down clamps 7 on their upper ends, so that the introduced light waveguide fibers do not spring out of the cassette 1'. Thus, the originally circular guide profiles or guide rails 2 can be seen, from which the light waveguides can be laid. These guide profiles or guide rails are bent inward slightly so that the guiding of the light waveguide fibers between the two guide rails is made easier. In addition, inlets 6' or 25' are arranged in such a way that they extend tangentially to the circular guide rails 2, so that further guiding can take place without endangering the light waveguide fibers. In addition, a splice mount 8 in which light waveguide splices can be fixed is provided on the base 50. The pivoting axis 3 runs along the longitudinal edge of the cassette 1', and this axis has at least two laterally protruding axle pegs 4', with which the cassette 1' can be set in the mounts of a cassette holder 9' of FIG. 11. Using stop pins, which are snapped into holes in the axle pegs 4', the cassette 1' is fastened in the cassette holder 9'. The axle pegs 4' shown here have catch projections 5' with which a snapping in the cassette holder is possible for the purpose of holding the cassette in a position of ±30° relative to a horizontal line.

Figure 11:
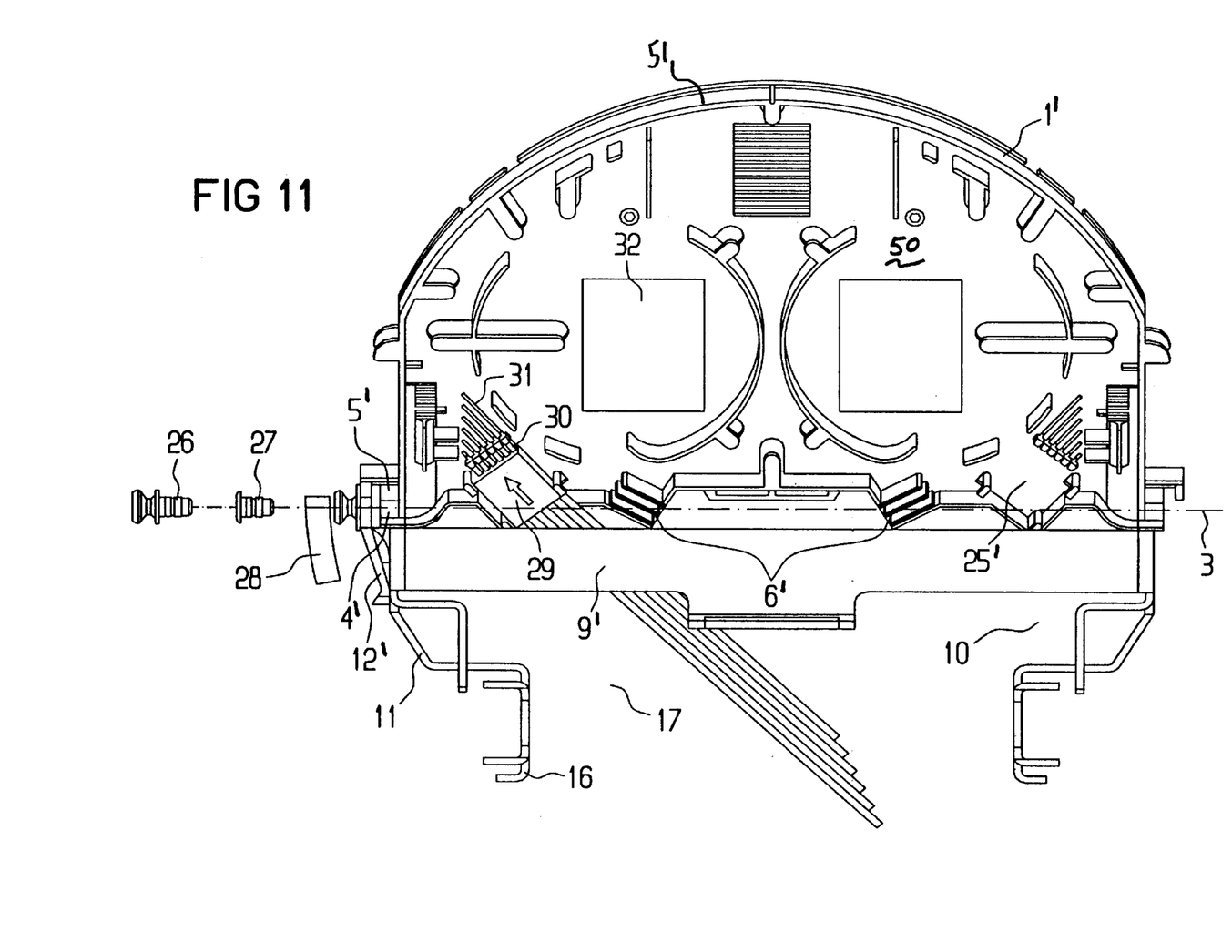
FIG. 11 is a top plan view of a modification of the cassette holder holding the cassette of FIG. 10.

The axle pegs 4' are terminated with fixing brackets that hold the cassettes laterally in the catch strips in addition to the stop pins, as is shown in the following Figures. In addition, pins 24 are provided between which reserve fibers can be fixed. The protective sheath or, respectively, protective tubes, with which the light waveguide fibers are guided from the partitioning cassette into the customer or subscriber cassettes, are fastened in the inlets 6' and 25'. The inlet 6' is provided for individual protective tubes. The inlet 25' is provided for the extrusion coated protective sheath connection that is snapped in at this location (as illustrated in FIG. 11). The openings at the ends of the protective tubes abut on a comb 30 having beveled edges pointing to the input of the tubes. In connection with grooves 31 in the base of the cassette, these edges serve as an aid to the introduction of the fibers. On the base 50 in the middle of the guide rails 2, there is a labeling field 32 for the designation of the stored splices in the splice holder or mount 8.

Figure 12:
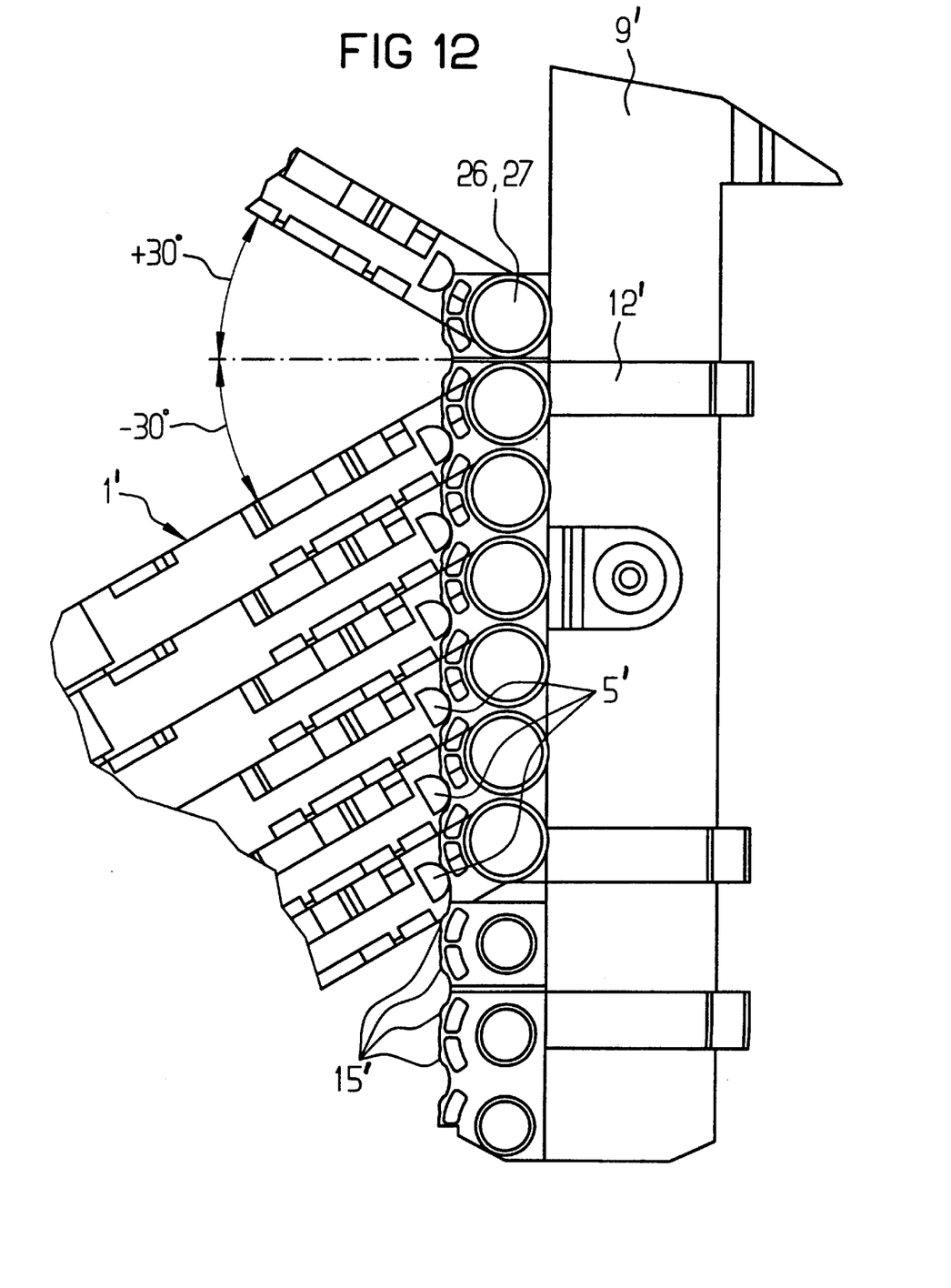
FIG. 12 is a side view of the modified cassette holder of FIG. 11 illustrating the various positions for cassettes therein.

As shown in FIGS. 11 and 12, the modified cassette 1' is arranged pivotably in the cassette holder 9' with its axle pegs 4' in the catch mechanism of the cassette holder 9'. The cassette holder 9' comprises two resilient catch rails 12' on both sides as a catch mechanism, whose latches are best illustrated in FIG. 12, and engage the catch projections 5' to hold the cassette in one of two positions. Stop pins 26 and 27 are also shown and will hold each of the cassettes in a respective opening in the catch strip with the pin 26 being designed to be a detachable pin, while the pin 27 is a non-detachable pin. In addition, in this view, it can be seen that the brackets 11 are attached to the cassette holder 9' by means of which an open space 10 for the fiber guiding between the individual cassettes is determined. Finally, a pivoting frame 16 is provided and mounted on the brackets 11 to be in the open space and forms a reserve space 17 for the storing or, respectively, guiding of reserve leads or uncut light waveguide leads. In addition, the protective sheath interconnection 29 is shown, which is introduced into the inlet 25' and is inserted into the comb 30. In addition, each of the cassettes 1' is provided with a fixing bracket 28 that respectively overlaps the catch strip 12' of the cassette holder 9' in order to achieve a firm holding of the cassette 1' when the entire cassette block is taken out of the cassette holder 9'.

As best illustrated in FIG. 12, the catch rails 12' are arranged in segments for holding a set number of cassettes. These are held onto the cassette holder 9'. This side view shows the embodiment modified in relation to the original shape, wherein it can be seen that the cassette holder 9' and the cassettes 1' are again arranged one over the other. The respective cassette 1' to be inserted is introduced in an approximately horizontal position into the catch strips until a stop is reached. With the stop pins 26 or 27, the cassette 1' is respectively held pivotably between the catch strips and can be folded from the above position to the rest or below position. After this folding, the cassette 1' is held fast at an angle, preferably ±30° from the horizontal, by the catch projections 5' and the latches 15' of the catch strip. If a force is now exerted by hand vertically upward or downward on the outer cassette edge, the cassette can be brought respectively into another position. The catch projections 5' press the latch 15' into a recess, so that the path for the cassette motion becomes free. After the catch projections 5' glide over the latch 15', this latch springs back and holds the cassette in the respective position. If access is now desired to a particular cassette 1', the cassettes that are above the selected cassette are folded upward and remain in this upper catch position. In this way, there results a double opening angle of approximately 60° so that the cassette is accessible for assembly or services purposes. If this cassette 1' is fastened with a detachable stop pin 26, it can be taken out of the cassette holder by detaching the stop pins 26, which is a great advantage for particular assembly technology, such as, for example, for storing the cassettes on the splicing apparatus for the splicing of fibers. On an upper end of the cassette holder 9', a bracket 11' can be seen, which holds the pivot frame 16 at a particular distance from the cassette block. The resulting open space is used to house the protective sheaths of the individual fibers.

Although various minor modifications may be suggested by those versed in the art, it should be understood that we wish to embody within the scope of the patent granted hereon all such modifications as reasonably and properly come within the scope of our contribution to the art.

We claim:

1. A cable sleeve with a holding apparatus for cassettes for storing and splicing light waveguides, wherein each cassette is individually accessible, said cable sleeve comprising a cassette holder and a plurality of cassettes, each cassette having, along a longitudinal edge, a pivot axle provided by two laterally projecting axle pegs, which extend from lateral edges of the cassette, each of the axle pegs having a catch projection, the cassette holder having means for engaging the axle pegs of each of the cassettes to hold the cassettes in a hinged fashion, the cassette holder having catch means for engaging the catch projections of the cassette to hold the cassette in at least one position, said catch means being in the form of a resilient catch rail comprising latches in which the catch projections of each of the cassettes can be snapped, said rail being deflectable in a direction parallel to the pivot axle so that the latches can be unlocked by means of pressure being applied on the catch rail, the cassette holder having an open space to provide a channel for light waveguides to be guided to the individual cassettes and each of the cassettes having inlets for the light waveguides to the cassette being arranged on said longitudinal edge disposed on the pivoting axle, at least two of the inlets being arranged on said longitudinal edge, with the direction of introduction extending tangentially to circular guide rails provided in each of the cassettes, so that the at least two inlets are directed at an angle to the pivoting axle and are directed pointing away from one another.

2. A cable sleeve according to claim 1, which includes a pivoting frame fastened to the cassette holder on a side opposite the cassettes to form a reserve space for receiving and storing light waveguides.

3. A cable sleeve according to claim 1, wherein the cassette holder includes a catch receptacle for receiving the axle pegs of each of the cassettes.

4. A cable sleeve according to claim 1, wherein one of the cassettes is arranged as input and output cassettes and at least one cassette is arranged as a splicing cassette and bundles of light waveguides coming in from a main cable are introduced to the input/output cassette and from there are partitioned and given to two-fiber guiding with two fibers respectively on the splicing cassettes and the fibers are spliced on the respective splicing cassettes and are led back again to the input/output cassette and from there are guided in an outgoing light waveguide bundle to additional distributors and from there to the subscribers.

5. A cable sleeve according to claim 1, wherein one of the cassettes is arranged as an input/output cassette and at least one cassette is arranged as a splicing cassette and a light waveguide bundle coming from the main cable is introduced into the input/output cassette and from there, given two-fiber guiding, are partitioned with two fibers to each of the splicing cassettes and the fibers are spliced in the respective splicing cassettes and from there are individually guided directly to subscribers in fiber bundles containing two fibers each.

6. A cable sleeve according to claim 1, wherein one of the cassettes is arranged as an input/output cassette, a subscriber cassette is provided for each subscriber and at least one cassette is arranged as a splicing cassette on the cassette holder, incoming and outgoing light waveguide bundles from a main cable are introduced to the input/output cassette and from there are divided and partitioned to each of the splicing cassettes and in that the fibers are spliced in respective splicing cassettes and from there are guided to a subscriber cassette and combined into two light waveguide bundles extending to the subscribers.

7. A cable sleeve according to claim 1, wherein one of the cassettes is an input/output cassette and another cassette is a splicing cassette and an incoming and outgoing light waveguide bundle from a main cable are introduced to the input/output cassette and are partitioned to the splicing cassettes and from there, two light waveguide fiber bundles are respectively guided to the subscribers.

8. A cable sleeve according to claim 1, wherein one of the cassettes is an input/output cassette and at least one other cassette is a splicing cassette, the incoming and outgoing light waveguide bundles are introduced to the input/output cassette and from there are partitioned to the splicing cassettes and from the splicing cassettes go to the subscriber as a bundle of four fibers.

9. A cable sleeve according to claim 1, wherein fibers are guided between the individual cassettes in flexible protective sheaths.

10. A cable sleeve according to claim 1, wherein one of the positions for the cassette extends at a 30° angle relative to a horizontal line.

11. A cable sleeve according to claim 1, wherein the cassette can be moved to a position extending 30° above a horizontal and the catch means can release all cassettes in this position simultaneously.

12. A cable sleeve according to claim 1, wherein each cassette can be removed from the cassette holder individually.

13. A cable sleeve according to claim 12, wherein a protective sheath connection is provided in each of the cassettes.

14. A cable sleeve according to claim 13, wherein the protective sheath connection abuts against a comb, which is connected by grooves which are arranged in the cassette base for the guiding of fibers.

15. A cable sleeve according to claim 12, which includes hold-down clamps for fibers arranged in the cassette and the hold-down clamps are bent downward at the ends.

16. A cable sleeve according to claim 12, wherein the catch means of the cassette holder can be individually removed from the cassette holder to remove each of the cassettes.

17. A cable sleeve according to claim 12, wherein each of the cassettes is detachably connected by stop pins in the cassette holder.

18. A cable sleeve according to claim 12, wherein each of the cassettes is connected in a non-detachable fashion by stop pins to the cassette holder and the cassette holder has portions removable to allow removal of the cassettes.

19. A cable sleeve according to claim 12, wherein each of the cassettes is provided with a fixing bracket that reaches over a catch strip of the cassette holder and forms a holder for the cassette during removal.

* * * * *